(12) United States Patent
Tong et al.

(10) Patent No.: US 8,807,409 B2
(45) Date of Patent: Aug. 19, 2014

(54) CAR HOLDER

(71) Applicant: HTC Corporation, Taoyuan County (TW)

(72) Inventors: Hann-Shi Tong, Taoyuan County (TW); Chih-Wei Huang, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 0 days.

(21) Appl. No.: 13/711,632

(22) Filed: Dec. 12, 2012

(65) Prior Publication Data

US 2014/0158732 A1    Jun. 12, 2014

(51) Int. Cl.
*B60R 11/02*    (2006.01)
*B60R 11/04*    (2006.01)

(52) U.S. Cl.
CPC .................. *B60R 11/02* (2013.01); *B60R 11/04* (2013.01); *B60R 11/0252* (2013.01)
USPC .......................................... 224/548; 224/275

(58) Field of Classification Search
CPC ...... B60R 11/02; B60R 11/04; B60R 11/0252
USPC ................. 224/548, 275; 296/24.34
See application file for complete search history.

(56) References Cited

U.S. PATENT DOCUMENTS

| | | | | |
|---|---|---|---|---|
| 5,556,017 A * | 9/1996 | Troy | .............................. | 224/549 |
| 6,062,518 A * | 5/2000 | Etue | ......................... | 248/231.21 |
| 6,158,793 A * | 12/2000 | Castro | ......................... | 296/1.07 |
| 6,955,280 B2 * | 10/2005 | Saitoh et al. | .................. | 224/269 |
| 8,276,863 B2 * | 10/2012 | Niwai et al. | ............... | 248/278.1 |
| 2002/0100782 A1 * | 8/2002 | Marvin | ......................... | 224/483 |
| 2011/0031287 A1 * | 2/2011 | Le Gette et al. | ............. | 224/101 |
| 2011/0132950 A1 * | 6/2011 | Culver | ......................... | 224/485 |
| 2011/0220697 A1 * | 9/2011 | Luk et al. | ....................... | 224/567 |
| 2011/0278885 A1 * | 11/2011 | Procter et al. | ................. | 297/135 |
| 2012/0280014 A1 * | 11/2012 | Lopez-Apodaca | ........... | 224/539 |
| 2013/0032617 A1 * | 2/2013 | Adelman et al. | .............. | 224/191 |

* cited by examiner

*Primary Examiner* — Brian D Nash
(74) *Attorney, Agent, or Firm* — Jianq Chyun IP Office

(57) ABSTRACT

A car holder adopted to be assembled with a mobile apparatus is provided. The mobile apparatus has a loudspeaker located at a back portion thereof, and the loudspeaker has a sound-output surface. The car holder includes a fixing module and a supporting base. The fixing module is adopted to be assembled within a car, and the supporting base is connected to the fixing module. The supporting base has a leaning surface and a full opening indented therein. When the mobile apparatus is assembled to the supporting base, the back portion leans against the leaning surface, and a portion of the full opening is covered by the mobile apparatus. The sound-output surface of the loudspeaker communicates with the full opening, and sound wave outputted by the sound-output surface, after being reflected by the full opening, is transmitted from the full opening in a direction far away from the leaning surface.

5 Claims, 7 Drawing Sheets

CAR HOLDER

BACKGROUND

1. Field of the Application

The invention relates to a holder, and more particularly, to a car holder assembled within a car, and this car holder is adopted to be assembled with a mobile apparatus.

2. Description of Related Art

Nowadays, functions possessed by a variety of mobile apparatuses have continued to increase, and thus, the mobile apparatuses begin to have an inseparable relationship with the daily life. Taken a user driving on the way for an example, the driver gradually becomes dependent on a call or a position tracking function of the mobile apparatus so as to keep communication with the outside world or to convey messages while driving. Therefore, a car holder for relatively fixing the mobile apparatus in the car becomes an indispensable vehicle accessory. However, since a loudspeaker of the mobile apparatus is located at a back portion of the mobile apparatus, after the driver has positioned a display screen of the mobile apparatus toward oneself and fixed the mobile apparatus on the car holder, a sound outputting position of the loudspeaker a the back portion is covered by the car holder, such that a sound quality outputted by the mobile apparatus is poor.

Otherwise, in order to void the sound outputting position of the loudspeaker in the mobile apparatus from being covered, a leaning surface of the car holder would have a sound transmission through hole so as to send out the sound from the through hole. However, in this type of through hole design, the sound of the loudspeaker is transmitted away from the driver when sends out from the through hole, and as a result, the sound quality is also poor and unclear, which may cause inconveniences for the driver in using the call or other voice function of the mobile apparatus during the car drive.

SUMMARY OF THE APPLICATION

The invention provides a car holder adopted to be assembled with a mobile apparatus, and a driver can receive sound having a favorable quality when using the mobile apparatus inside the car.

The invention provides a car holder adopted to be assembled with a mobile apparatus. The mobile apparatus has a loudspeaker located at a back portion of the mobile apparatus, and the loudspeaker has a sound-output surface. The car holder includes a fixing module adopted to be assembled within a car and a supporting base connected to the fixing module. The fixing module has a leaning surface and a full opening indented at the leaning surface. When the mobile apparatus is assembled to the supporting base, the back portion of the mobile apparatus is leaned against the leaning surface, a portion of the full opening is covered by the mobile apparatus, and the sound-output surface of the loudspeaker communicates with the full opening. Now, sound wave outputted by the sound-output surface, after being reflected by the full opening, is transmitted from the full opening in a direction far away from the leaning surface.

In an embodiment of the invention, the supporting base has a plurality of retaining units adopted to retain the mobile apparatus.

In an embodiment of the invention, the full opening has an indented portion, and the sound wave outputted by the loudspeaker is firstly centralized by the indented portion, and then transmitted from the full opening in a direction far away from the leaning surface after being reflected by the full opening.

In an embodiment of the invention, when the mobile apparatus is disposed on the car holder, the sound-output surface is located in a range of the full opening.

According to the foregoing, the car holder of the invention reflects the sound wave outputted by the mobile apparatus assembled thereon via the full opening indented at the leaning surface, so that the sound heard by the driver is clearer.

In order to make the aforementioned and other features and advantages of the present application more comprehensible, several embodiments accompanied with figures are described in detail below.

BRIEF DESCRIPTION OF THE DRAWINGS

The accompanying drawings are included to provide a further understanding of the application, and are incorporated in and constitute a part of this specification. The drawings illustrate embodiments of the application and, together with the description, serve to explain the principles of the application.

DETAILED DESCRIPTION OF DISCLOSED EMBODIMENTS

Figure 1:
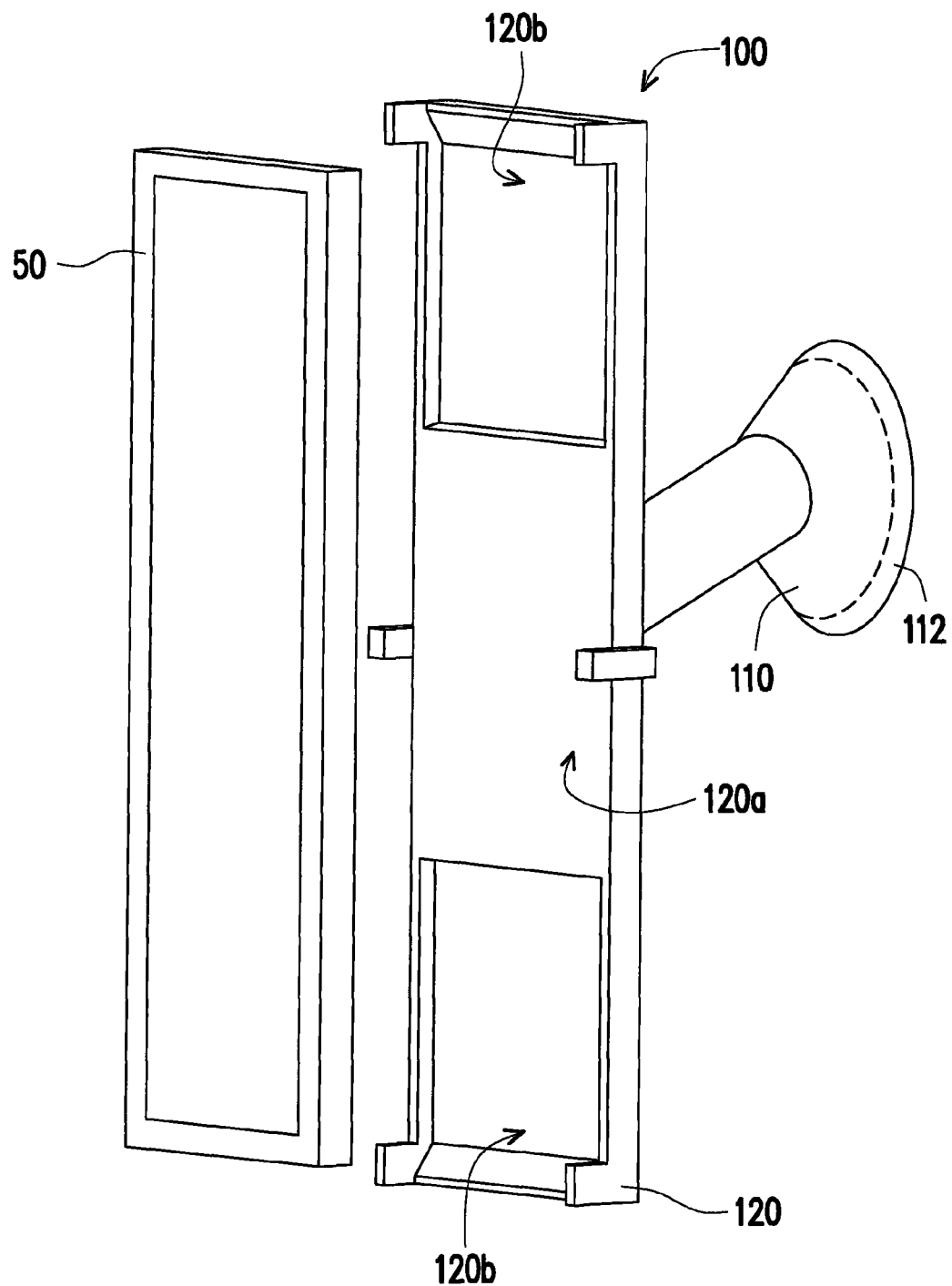
FIG. 1 is a schematic perspective view illustrating a car holder and a mobile apparatus not yet assembled on the car holder according to an embodiment of the invention.
Figure 2:
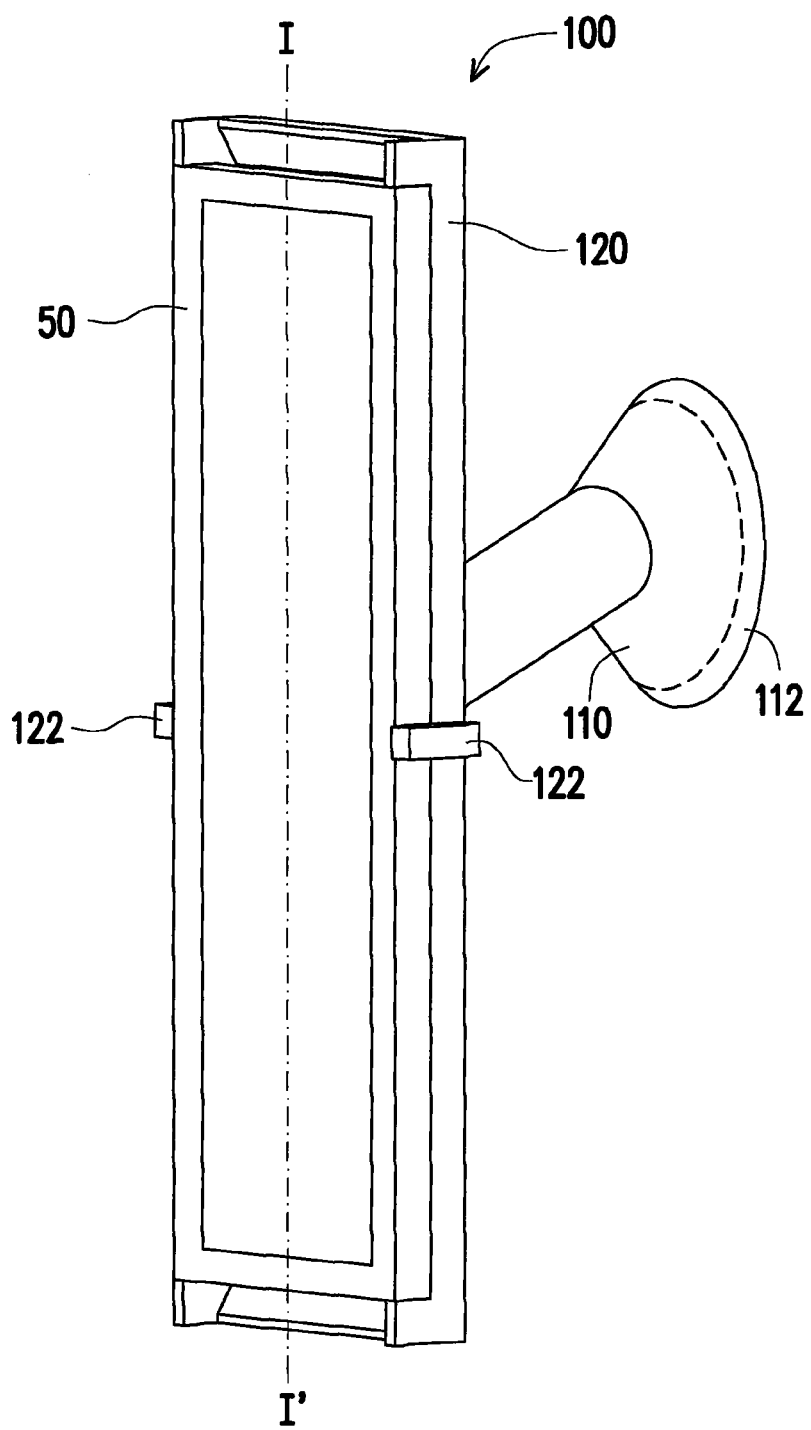
FIG. 2 is a schematic perspective view illustrating the mobile apparatus of FIG. 1 after being assembled on the car holder.

FIG. 1 is a schematic perspective view illustrating a car holder and a mobile apparatus not yet assembled on the car holder according to an embodiment of the invention. FIG. 2 is a schematic perspective view illustrating the mobile apparatus of FIG. 1 after being assembled on the car holder. Referring to FIG. 1, a car holder 100 is adopted to be assembled with a mobile apparatus 50. The mobile apparatus 50, for example, is a smart phone having a global positioning system (GPS). Next, referring to FIG. 2, by assembling the mobile apparatus 50 on the car holder 100, a driver may use the global positioning system in the mobile apparatus 50 to understand a choice of routes during traveling, and to use a call function of the mobile apparatus 50 when driving on the way.

Figure 3:
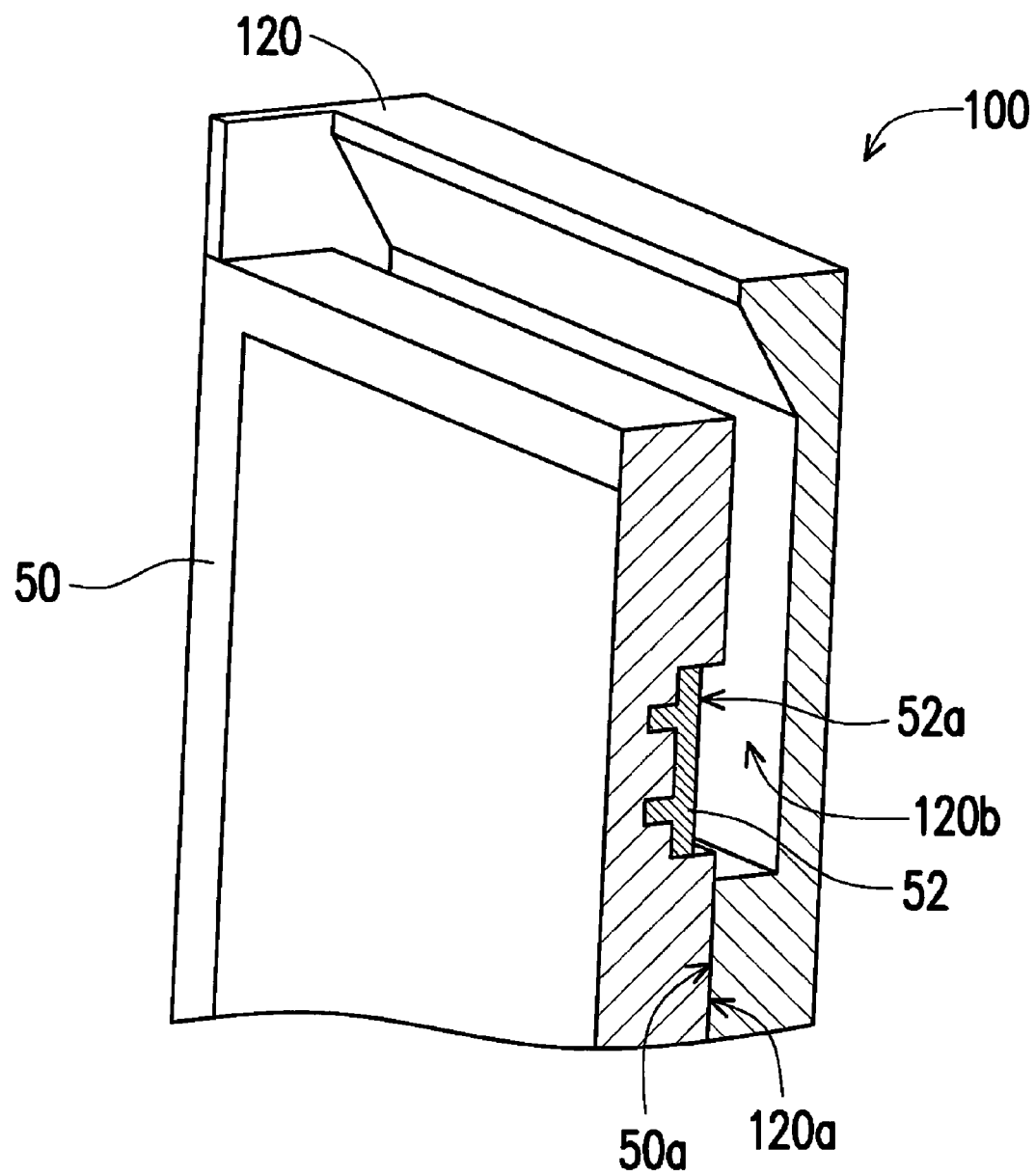
FIG. 3 is a partial sectional schematic diagram illustrating the car holder and the mobile apparatus of FIG. 2 along line I-I'.

FIG. 3 is a partial sectional schematic diagram illustrating the car holder and the mobile apparatus of FIG. 2 along line I-I'. Referring to FIG. 3, the mobile apparatus 50 has a loudspeaker 52 located at a back portion 50a thereof, and the loudspeaker 52 has a sound-output surface 52a. The mobile apparatus 50 is adopted for outputting sound, such as a general call or voice traffic, via the sound-output surface 52a of the loudspeaker 52.

Next, referring to FIG. 1, the car holder 100 includes a fixing module 110 and a supporting base 120. The fixing module 110 is adopted to be assembled within a car, and the supporting base 120 is connected to the fixing module 110 and has a leaning surface 120a and a full opening 120b indented at the leaning surface 120a. Then, referring to FIG. 3, when the mobile apparatus 50 is assembled to the supporting base 120, the back portion 50a of the mobile apparatus 50 is leaned against the leaning surface 120a, so that the mobile apparatus 50 is well supported on the car holder 100. Now, a portion of the full opening 120b is covered by the mobile apparatus 50. The sound-output surface 52a of the loudspeaker 52 of the mobile apparatus 50 communicates with the full opening 120b, and sound wave outputted by the loudspeaker 52 from the sound-output surface 52a, after being reflected by the full opening 120b, is transmitted from the full opening 120b in a direction far away from the leaning surface 120a.

When the driver uses the mobile apparatus 50 in the car, since the sound-output surface 52a communicates with the full opening 120b, the sound wave outputted by the loudspeaker 52 of the mobile apparatus 50 may be transmitted through the full opening 120b of the car holder 100, and because the full opening 120b has an inclined plane for reflecting the sound wave, the sound wave outputted by the loudspeaker 52, after being reflected by the full opening 120b, is transmitted in the direction far away from the leaning surface 120a. This direction is substantially transmitted towards the driver. As such, in terms of the driver, even though the loudspeaker 52 of the mobile apparatus 50 is at the back side, a transmission means of the sound is to be firstly reflected by the full opening 120b, and then transmitted from the full opening 120b in the direction far away from the leaning surface 120a; therefore, the sound wave, in fact, is eventually transmitted towards the driver, so that the driver may still hear clear sound when using the mobile apparatus 50 during the drive. In the present embodiment, when the mobile apparatus 50 is assembled on the car holder 100, the sound-output surface 52a is substantially located in a range of the full opening 120b. As a result, it can make sure that the sound wave outputted by the loudspeaker 52 of the mobile apparatus 50 from the sound-output surface 52a may be reflected by the full opening 120b, and transmitted from the full opening 120b in the direction far away from the leaning surface 120a.

Referring to FIG. 2 again, in the present embodiment, the supporting base 120 has a plurality of retaining units 122 adopted to retain the mobile apparatus 50 when the mobile apparatus 50 is assembled on the car holder 100, so that mobile apparatus 50 can be assembled on the car holder 100 more firmly. Moreover, in the car holder 100 of the present embodiment, the supporting base 120 is pivoted on the fixing module 110. For example, there is a universal joint included between the two, and the supporting base 120 uses the universal joint to pivot on the fixing module 110, so that the supporting base 120 may rotate in relative to the fixing module 110. The driver may adjust the mobile apparatus 50 assembled on the car holder 100 via a means of rotating the supporting base 120 in relative to the fixing module 110, so as to place the mobile apparatus 50 at a position suitable for the driver to view or listen.

In addition, in the present embodiment, the fixing module 110 has an adsorption element 112, and the car holder 100 may be adsorbed within the car, such as on a windshield of the car or in front of the driver seat, via the adsorption element 112, so that the car holder 100 may be fixed in the car. When a user is to separate the car holder 100 from the car, the adsorption element 112 may be directly unplugged from the car, so as to detach the car holder 100 from the car.

As illustrated in FIG. 1, the present embodiment has taken the supporting base 120 of the car holder 100 including two full openings 120b as an example. The two full openings 120b are respectively located at two opposite sides of the car holder 100. Therefore, when the mobile apparatus 50 is assembled at the car holder 100, the sound-output surface 52a of the loudspeaker 52 may selectively be assembled towards any one of the full openings 120b, so as to provide the driver with favorable assembling flexibility. Certainly, the invention does not limit the positions of the two full openings 120b on the car holder 100.

In addition, after the mobile apparatus 50 is assembled on the car holder 100, the sound-output surface 52a is located at a range of the full opening 120b. In the present embodiment, as illustrated in FIG. 3, the edge of the sound-output surface 52a has some distance away from the edge of the full opening 120b. This has the advantage in that the car holder 100 may be adopted at conditions of having the loudspeaker 52 to be located at different positions of the back portion 50a of the mobile apparatus 50. For instance, when the position of the loudspeaker 52 is moved to a lower part of the drawing in FIG. 2, the loudspeaker 52 is still located in the range of the full opening 120b. Namely, a size of the full opening 120b may be designed to be suitable for a variety of different types of mobile apparatuses.

Figure 4:
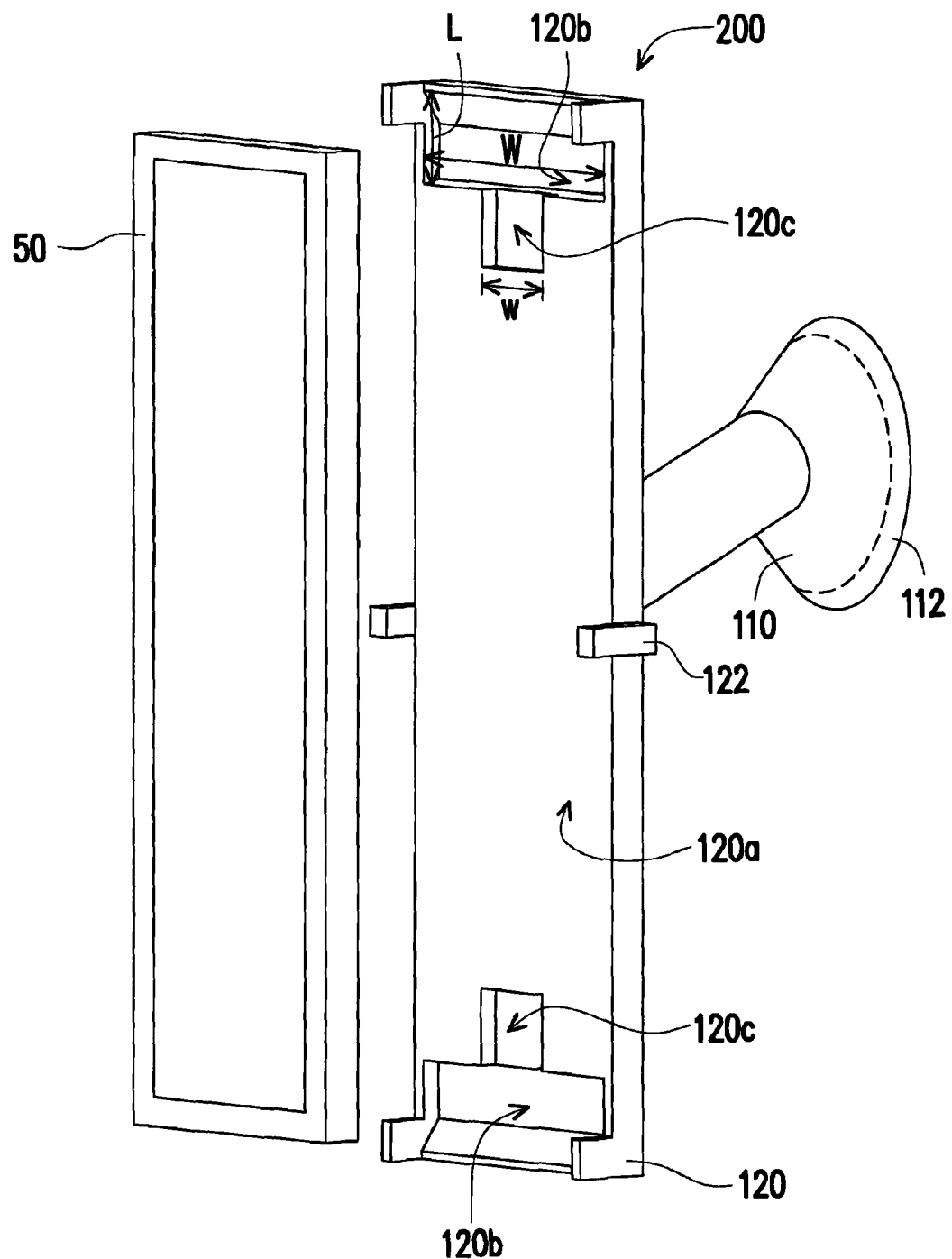
FIG. 4 is a schematic perspective view illustrating a car holder and a mobile apparatus not yet assembled on the car holder according to another embodiment of the invention.
Figure 5:
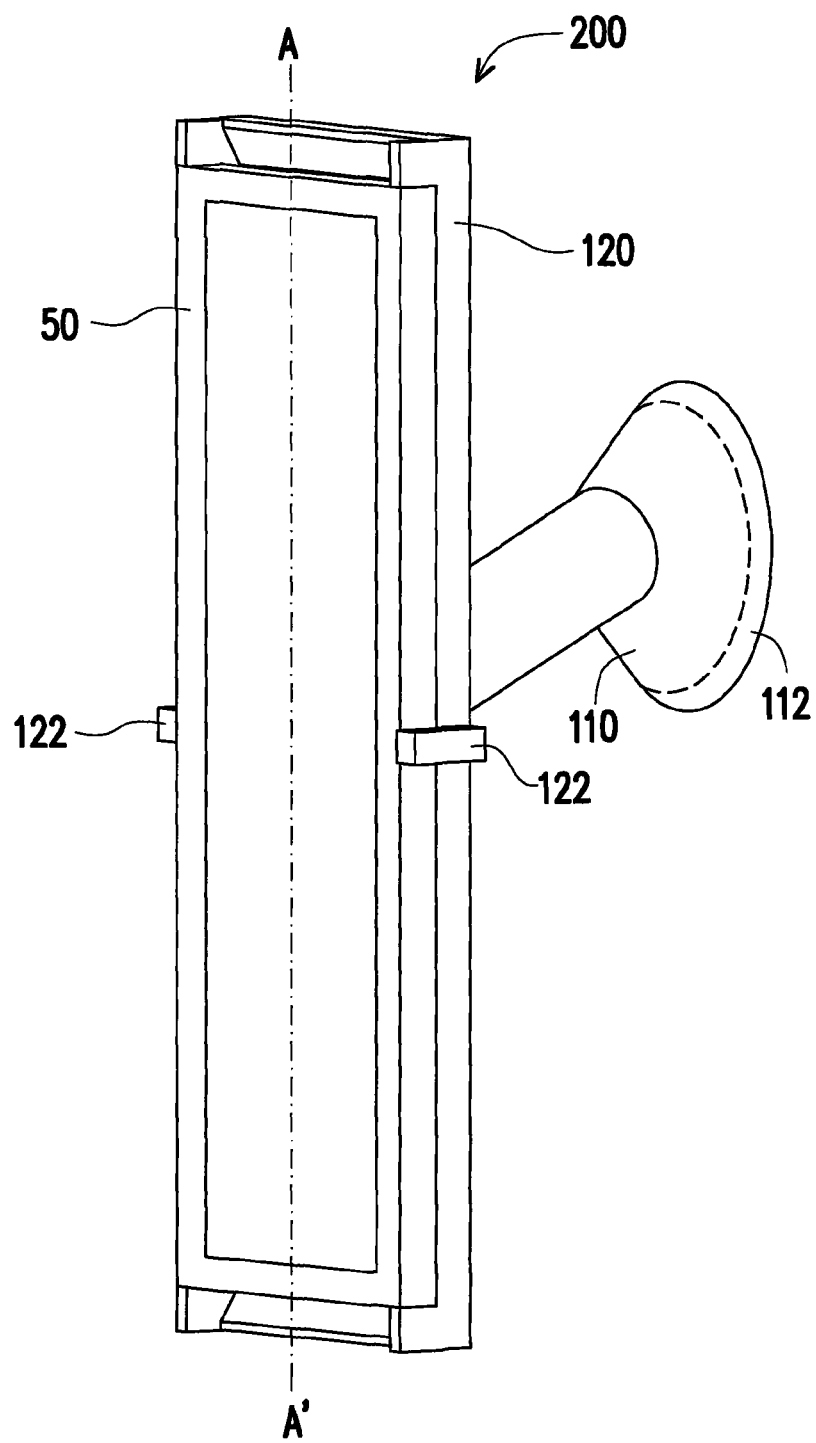
FIG. 5 is a schematic perspective view illustrating the mobile apparatus of FIG. 4 after being assembled on the car holder.

FIG. 4 is a schematic perspective view illustrating a car holder and a mobile apparatus not yet assembled on the car holder according to another embodiment of the invention. Referring to FIG. 4, a car holder 200 is adopted to be assembled with the mobile apparatus 50. FIG. 5 is a schematic perspective view illustrating the mobile apparatus of FIG. 4 after being assembled on the car holder. Referring to FIG. 5, by assembling the mobile apparatus 50 on the car holder 200, the driver may use a global positioning system on the mobile apparatus 50 to understand the choice of routes during traveling, and to use the call function of the mobile apparatus 50 when driving on the way.

Figure 6:
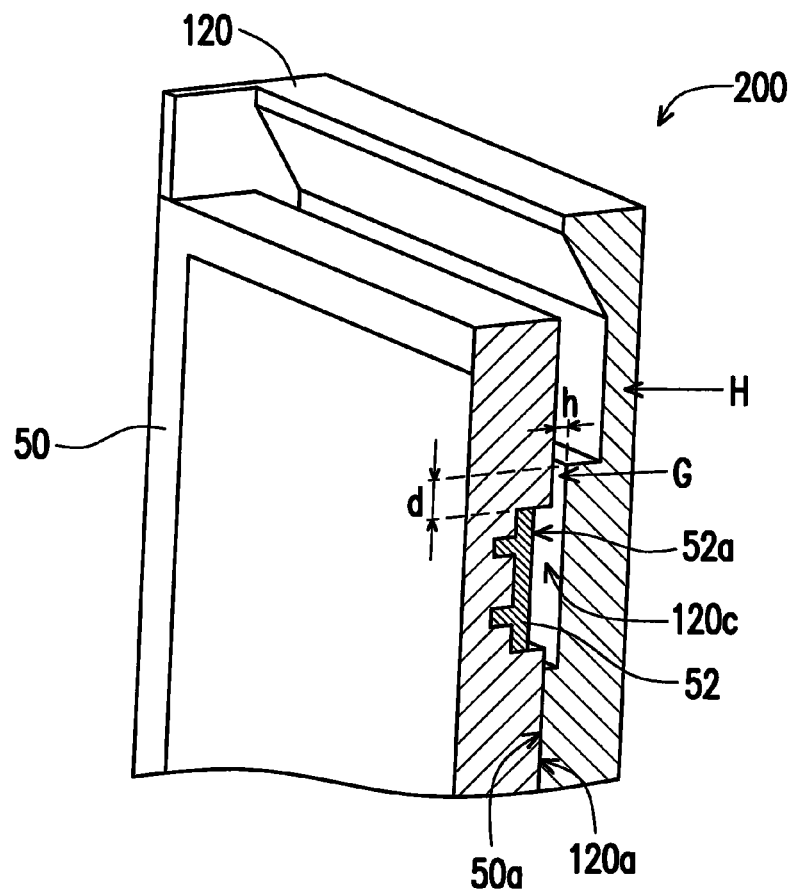
FIG. 6 is a partial sectional schematic diagram illustrating the car holder and the mobile apparatus of FIG. 4 along line A-A'.

FIG. 6 is a partial sectional schematic diagram illustrating the car holder and the mobile apparatus of FIG. 4 along line A-A'. Referring to FIG. 4 and FIG. 6, the car holder 200 of the present embodiment is substantially similar to the aforementioned car holder 100; and therefore, same notations are adopted for representing the same or similar components. A main difference between the car holder 200 of the present embodiment and that of the previous embodiment is that, the full opening 120b has an indented portion 120c. The sound wave outputted by the loudspeaker 52 of the mobile apparatus 50 is firstly concentrated by the indented portion 120c, and then transmitted from the full opening 120b in the direction far away from the leaning surface 120a after being reflected by the full opening 120b. Therefore, in the present embodiment, the sound wave outputted by the mobile apparatus 50, in addition to being transmitted towards the driver via reflecting by the full opening 120b, is firstly concentrated at the indented portion 120c, so that the sound wave is not dissipated during the process of transmission. The sound wave, after being concentrated by the indented portion 120c, is then reflected by the full opening 120b towards the direction of the driver, so that the driver can a more favorable sound quality.

The present embodiment and the previous embodiment both have taken the car holder 200 including the two full openings 120b as examples for illustration, and in the present embodiment, one of the full opening 120b has the indented portion 120c. The two full openings 120b are respectively located at the opposite sides of the car holder 200, and an advantage thereof is the same as the previous one, such that the driver may selectively assemble the sound-output surface 52a of the loudspeaker 52 towards any of the full openings 120b.

In the embodiment of FIG. 4, the size of the full opening 120b may be identified in a specific value through simulation, and an effect of enhancing the sound wave of a specific bandwidth in the loudspeaker 52 is achieved by using this specific value for design. The following provides examples for illustrating limiting conditions, adopted variables and results of the stimulation.

Parameters during the simulation may be referred to the labels in FIG. 4. The limiting conditions of the present simulation are as follows:

In the present simulation, a type of the loudspeaker 52 is not limited, such that the loudspeaker 52 may be of a magnetic coil type or a piezoelectric type.

A position of the loudspeaker 52 must be within the range of the full opening 120b so as to transmit the sound wave.

A shape of the full opening 120b must be consistent with the opening of the loudspeaker 52, and the full opening 120b has to face towards the loudspeaker 52 and at least 0.1 cc volume apart from the thin film of the loudspeaker 52.

A gap G used in the simulation refers to a space between an outer casing of the mobile apparatus 50 to the car holder 100.

A width w of the gap G must be consistent with a width of the loudspeaker 52, and a height of the gap G must be larger than 0.5 mm.

Figure 7:
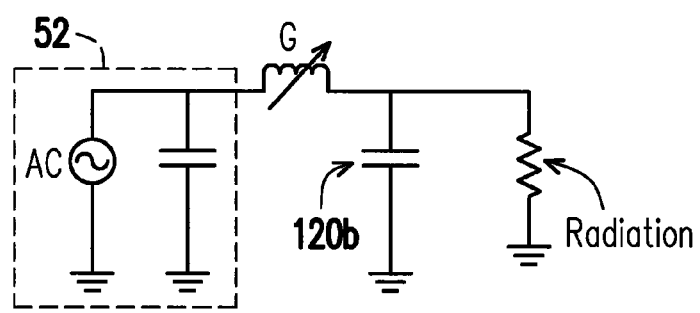
FIG. 7 is a virtual AC circuit schematic diagram according to the embodiment illustrated in FIG. 4.

FIG. 7 is a virtual AC circuit schematic diagram according to the embodiment illustrated in FIG. 4. In the present embodiment, the loudspeaker 52, the full opening 120b and the gap G may be converted into a virtual AC circuit. A length d of the gap G may be adjusted so as to enable the loudspeaker 52 to generate an increase in sound pressure in an intermediate frequency range. In the experiment, in this generated intermediate frequency range, a resonance frequency at 4 kHz can provide the best sound and music performance. According to the aforementioned limiting conditions, the size of the full opening 120b and the size of the gap G may be adjusted to comply with the formula $f_0=(1/2\pi)\times(1/2L\times C)^{1/2}$.

In the aforementioned formula, $f_0$ is a frequency when the sound pressure is increased, L is an induction coefficient of the gap G, and $L=(1.21\times h)/(W\times d)$. C is a capacitance of the full opening 120b, and $C=(W\times L\times H)/(1.21\times 343)$. W, H, h, L and d are as labeled in FIG. 7A and FIG. 7B.

Figure 8:
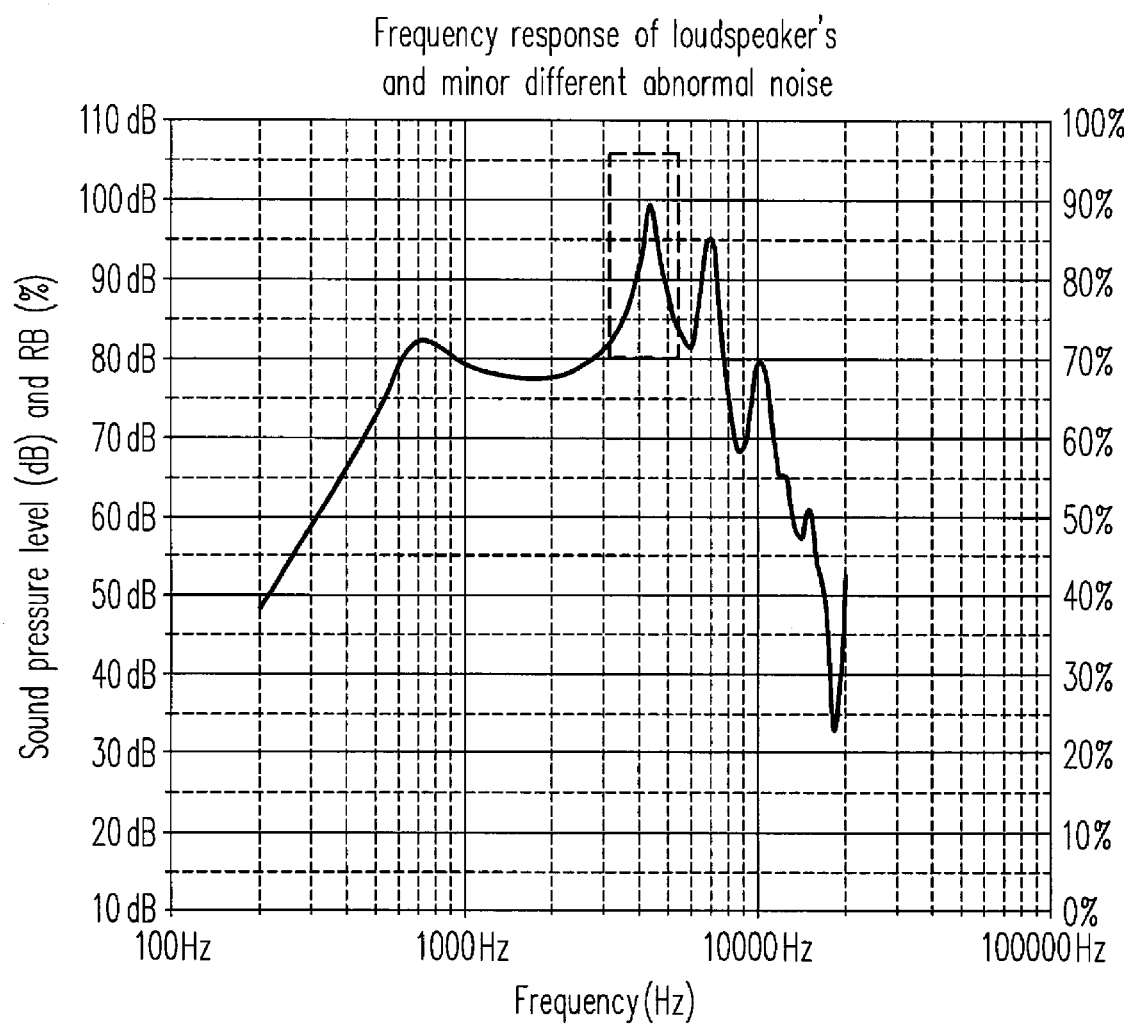
FIG. 8 is an analog frequency response diagram according to the embodiment illustrated in FIG. 4.

FIG. 8 is an analog frequency response diagram according to the embodiment illustrated in FIG. 4. It can be understood from the drawing, when the frequency of the sound wave is ranged between 3 kHz to 6 kHz, the sound pressure of the loudspeaker 52 has a peak value. Therefore, when a designer has determined the frequency $f_0$ corresponded to the sound pressure during the sound pressure increase, design sizes for W, H, h, L and d may then be determined inversely.

In summary, the supporting base of the car holder of the invention includes the full opening of an indented leaning surface; after the mobile apparatus is assembled on the car holder, the sound wave outputted by the loudspeaker of the mobile apparatus is firstly reflected by the full opening and then transmitted from the full opening from the direction far away from the leaning surface. Since the propagation direction of sound wave, after the sound wave is reflected by the full opening, is toward the driver, the driver may hear clearer sound. In addition, the sound wave may be firstly concentrated in the indented portion and then use the full opening to reflect, so that the sound quality heard by the driver is much more favorable.

It will be apparent to those skilled in the art that various modifications and variations can be made to the structure of the application without departing from the scope or spirit of the application. In view of the foregoing, it is intended that the application cover modifications and variations of this application provided they fall within the scope of the following claims and their equivalents.

What is claimed is:

1. A car holder adopted to be assembled with a mobile apparatus, the mobile apparatus having a loudspeaker located at a back portion of the mobile apparatus, and the loudspeaker having a sound-output surface, the car holder comprising: a fixing module, adopted to be assembled within a car; and a supporting base, connected to the fixing module and having a leaning surface and a recess indented at the leaning surface, wherein when the mobile apparatus is assembled to the supporting base, the back portion of the mobile apparatus is leaned against the leaning surface, a portion of the recess is covered by the back portion of the mobile apparatus, the sound-output surface of the loudspeaker communicates with the recess, and a sound wave outputted by the sound-output surface, after being reflected by the recess, is transmitted from the recess in a direction far away from the leaning surface; and wherein the recess has a narrow portion, a wide portion continued from the narrow portion and an inclined plane at an end of the wide portion away from the narrow portion, the sound wave outputted by the loudspeaker is firstly concentrated by the narrow portion, transmitted through the wide portion, and then transmitted via the wide portion in a direction far away from the leaning surface after being reflected by the inclined plane.

2. The car holder as recited in claim 1, wherein the supporting base has a plurality of retaining units adopted to retain the mobile apparatus.

3. The car holder as recited in claim 1, wherein the recess has a narrow portion, the sound wave outputted by the loudspeaker is firstly concentrated by the narrow portion, and then transmitted from the recess in a direction far away from the leaning surface after being reflected by the recess.

4. The car holder as recited in claim 1, wherein when the mobile apparatus is disposed at the car holder, the sound-output surface is located within a range of the recess.

5. The car holder as recited in claim 1, wherein a depth of the narrow portion is smaller than a depth of the wide portion.

* * * * *